United States Patent [19]
Sudo et al.

[11] Patent Number: 5,812,018
[45] Date of Patent: Sep. 22, 1998

[54] VOLTAGE BOOSTER CIRCUIT

[75] Inventors: Naoaki Sudo; Toshio Takeshima, both of Tokyo, Japan

[73] Assignee: NEC Corporation, Tokyo, Japan

[21] Appl. No.: 782,281

[22] Filed: Jan. 13, 1997

[30] Foreign Application Priority Data

Jan. 12, 1996 [JP] Japan ................................. 8-021769

[51] Int. Cl.$^6$ .................................................. G05F 3/02
[52] U.S. Cl. ........................ 327/537; 327/534; 327/536; 327/589; 307/110
[58] Field of Search ................................. 327/534, 535, 327/536, 537, 390, 589; 307/110; 365/185.18

[56] References Cited

U.S. PATENT DOCUMENTS

| | | | |
|---|---|---|---|
| 4,839,787 | 6/1989 | Kojima et al. | 363/60 |
| 4,970,409 | 11/1990 | Wada et al. | 307/296.1 |
| 5,422,590 | 6/1995 | Coffman et al. | 327/537 |
| 5,489,870 | 2/1996 | Arakawa | 327/536 |
| 5,675,279 | 10/1997 | Fujimoto et al. | 327/536 |

Primary Examiner—Timothy P. Callahan
Assistant Examiner—An T. Luu
Attorney, Agent, or Firm—Foley & Lardner

[57] ABSTRACT

In order to provide a voltage booster circuit to be controlled for generating either of a positive high voltage and a negative high voltage for economizing chip size, a voltage booster circuit of the invention, having a charge transfer circuit wherein charges are transfered from a lowest node (N10) to a highest node (N15), comprises switching means (1 and 2) for selecting one of a positive high voltage output mode and a negative high voltage output mode. A positive high voltage (VPP) is output from the highest node (N15) by supplying a power supply voltage (VCC) to the lowest node (N10) in the positive high voltage output mode, and a negative high voltage (VBB) is output from the lowest node (N10) by grounding the highest node (N15) in the negative high voltage output mode.

9 Claims, 8 Drawing Sheets

VOLTAGE BOOSTER CIRCUIT

BACKGROUND OF THE INVENTION

The present invention relates to a voltage booster circuit suitable for a semiconductor memory device such as an EEPROM or a flash memory, and more particularly to a voltage booster circuit able to generate both positive and negative high voltage by selection with only one circuit.

In a semiconductor memory device such as an EEPROM or a flash memory, a higher voltage than its power supply voltage or a lower voltage than its ground is used for data writing or erasing. For the purpose, various voltage booster circuits have been developed heretofore for producing the positive and the negative high voltage in the memory chips.

Especially, generally in a flash memory, a negative high voltage is used for data writing and a positive one is used for data erasing. Therefore, it has been required to provide plural voltage booster circuits in a memory chip.

Figure 9:
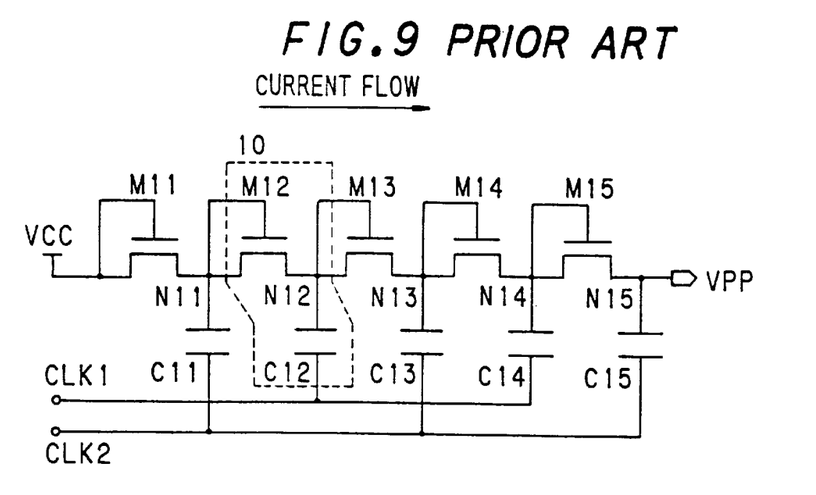
FIG. 9 is a circuit diagram illustrating a positive voltage booster circuit of a prior art.
Figure 10:
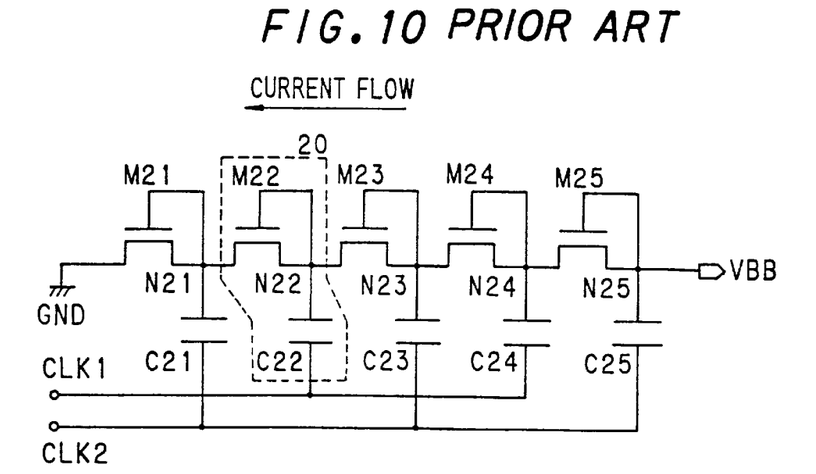
FIG. 10 is a circuit diagram illustrating a negative voltage booster circuit of a prior art.

FIG. 9 and 10 are circuit diagrams each illustrating example of conventional positive and negative voltage booster circuits, respectively.

The conventional positive voltage booster circuit shown in FIG. 9 has a charge transfer circuit composed of plural pumping units cascade-connected, each (10) comprising a capacitor (C12) and a diode connection of a MOS transistor (M12) coupled together at each node (N12). The other end of the diode connection (M12) is supplied from node (N11) of its preceding pumping unit and the first pumping unit is supplied from a positive power supply VCC, output voltage obtained from a positive output terminal VPP connected to a node N15 of the last pumping unit. The other end of capacitor of each pumping unit is connected to either of complementary clock signals CLK1 and CLK2 shown in FIG. 11, alternately.

The positive voltage booster circuit of FIG. 9 operates as follows.

When one of the complementary clock signals, the first clock signal CLK1 for example, at HIGH level is supplied to the capacitor C12 of the pumping unit 10, and the other complementary clock signal, the second clock signal CLK2, at LOW level is supplied to the capacitor C13 of the following pumping unit, potential of the node N12 is pushed to HIGH level by the clock signal CLK1 coupled through the capacitor C12. So, an electric current flows through the transistor M13 diode-connected from the node N12 to the node N13, charging the other end of the capacitor C13 pulled down by the second clock signal CLK2. In the same way, when of the first clock signal CLK1 turns to LOW level and the second clock signal CLK2 becomes HIGH level, the capacitor C12 is cut from the following pumping unit and charged through the transistor M12 from the node N11 of the preceding pumping unit being pushed up by the second clock signal CLK2.

By repeating these processes, the current flows from the left direction of FIG. 9 to the right direction, until the potential pulled down by LOW level of the complementary clock signal CLK1 or CLK2 of every node equilibrates to that of its preceding node pushed up by HIGH level of the other complementary clock signal CLK2 or CLK1 with difference of threshold voltage of the transistors M11 to M15. Thus a positive high voltage, proportional to number of pumping units and clock amplitude of the complementary clock signal CLK1 and CLK2, can be obtained from the positive output terminal VPP connected to node N15 of the last pumping unit.

In the conventional voltage booster circuit of FIG. 9, average potential of the positive high voltage also depends on frequency of the complementary signals CLK1 and CLK2 because each node is discharged the more in a cycle when the frequency is the lower.

The conventional negative voltage booster circuit of FIG. 10 also has a similar charge transfer circuit, where each pumping unit (20) is composed of a capacitor (C22) and a MOS transistor (M22) diode-connected inversely to the pumping unit of FIG. 10.

The direction difference of the diode connection here functions to pump up charges from each right node to leftwards until a grounded terminal GND. Thus a high negative voltage is obtained from an negative output terminal VBB connected to the most right node N25.

Figure 11:
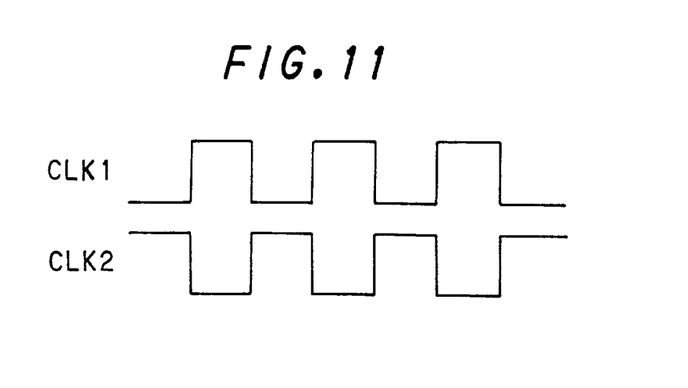
FIG. 11 is a waveform diagram illustrating an example of a complementary clock signals supplied to a voltage booster circuit.

As beforehand described, in a conventional nonvolatile semiconductor memory chip such as an EEPROM or a flash memory, there are provided on the chip with a plurality of these positive and negative voltage booster circuits, illustrated in FIG. 9 and 11, for obtaining positive and negative high voltages, respectively. This costs much space in the chip and accordingly, has hindered to reduce the chip size.

Moreover, today's increasing need of cutting electric power consumption demands still reducing power supply voltage itself. However, with reduced power supply, there is obtained but a small peak to peak value of the complementary clock signals. So, for obtaining the same high voltage, more pumping units are to be provided on the memory chip, costing more chip space too.

SUMMARY OF THE INVENTION

Therefore, a primary object of the present invention is to provide a voltage booster circuit which can produce both positive and negative high voltages with only one circuit, enabling chip size reduction.

In order to achieve the object, a voltage booster circuit of the present invention, having a charge transfer circuit wherein charges are transfered from a lowest node to a highest node, comprises switching means for selecting one of a positive high voltage output mode and a negative high voltage output mode. A positive high voltage is output from the highest node by supplying a power supply voltage to the lowest node in the positive high voltage output mode, and a negative high voltage is output from the lowest node by grounding the highest node in the negative high voltage output mode.

Therefore, both positive and negative high voltages can be obtained with only one circuit by controlling the switching means.

Further, amplitude or frequency of complementary clock signals supplied to the charge transfer circuit in the positive high voltage output mode is controlled to be different to that of the complementary signals in the negative high voltage output mode, in the invention.

Therefore, both positive and negative high voltages of desired voltages can be obtained with only one circuit by appropriately preparing amplitude or frequency of the complementary signals in the invention.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
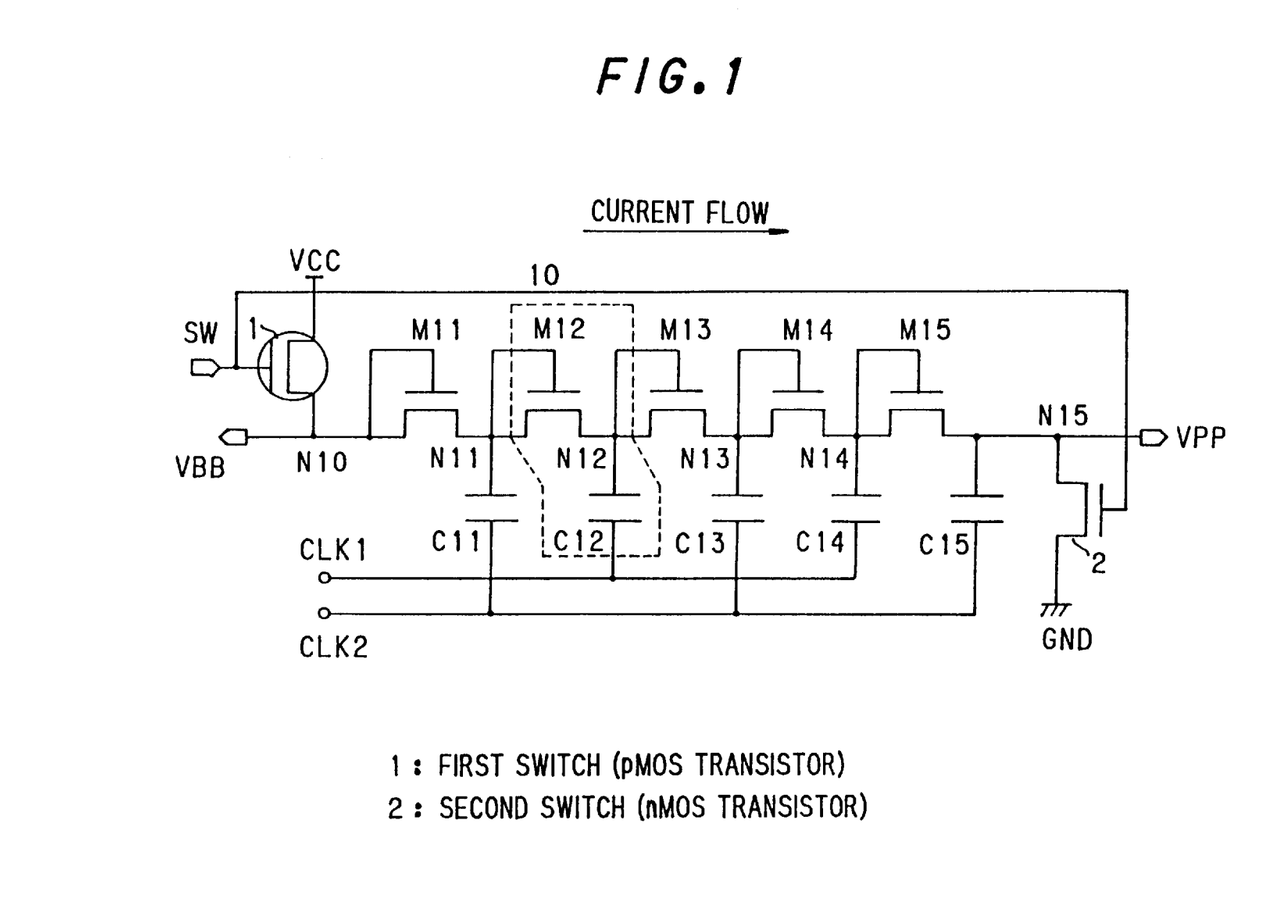
FIG. 1 illustrates a configuration of an embodiment of the invention.

FIG. 1 is a circuit diagram illustrating a configuration of an embodiment of the present invention, wherein further provided, compared with the conventional voltage booster circuits of FIG. 9 previously described, a negative output terminal VBB connected to a node N10 for generating a lowest potential in the circuit, a first switch 1 through which the positive power supply VCC is supplied to the node N10, and a second switch 2 through which the positive output terminal VPP is grounded.

Therefore, a positive high voltage and a negative high voltage can be generated by controlling the first and the second switch 1 and 2, in the embodiment.

In the embodiment, a p-MOS transistor is used for the first switch 1, and an n-MOS transistor for the second switch 2, but it is apparent that the present invention is not restricted to the configuration of FIG. 1. For example, any type of switchs can be applied there in the scope of the invention.

Figure 2:
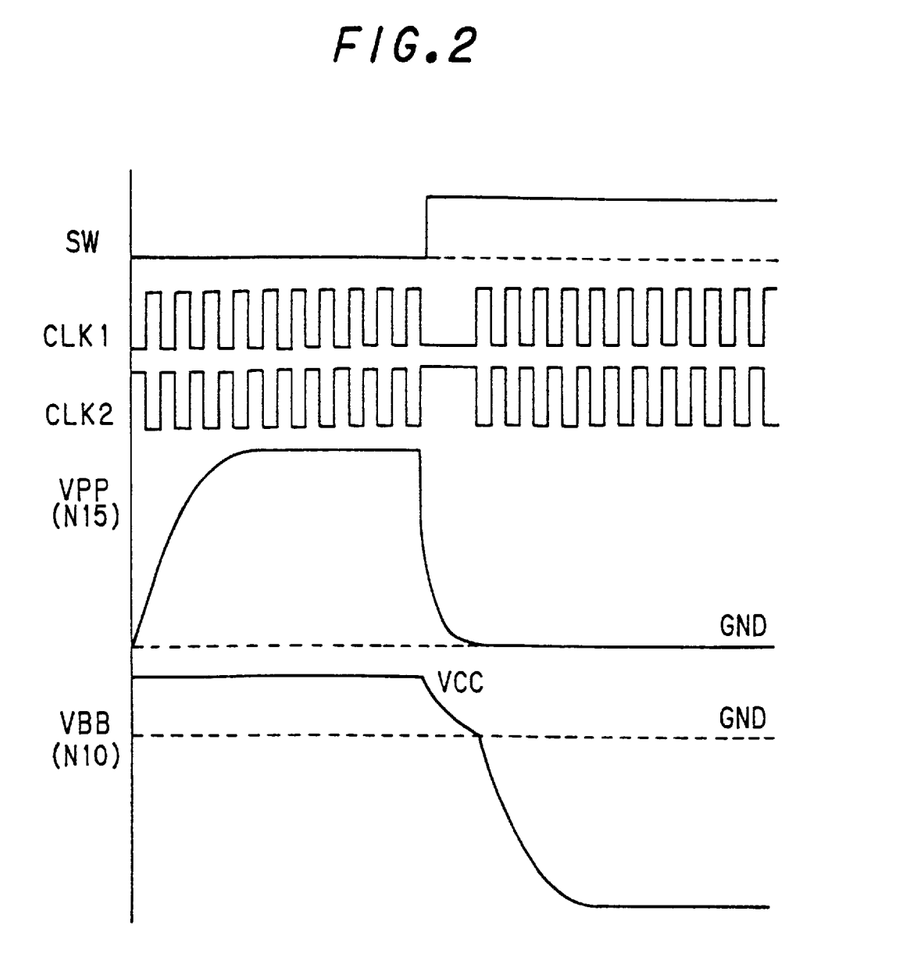
FIG. 2 is a waveform diagram illustrating the embodiment of FIG. 1.

Now, operation of the embodiment is described in connection with a waveform diagram of FIG. 2.

When the pumping clocks CLK1 and CLK2 are active and a control signal of LOW level is applied to a switch control terminal SW turning to ON the switch transistor 1 and to OFF the switch transistor 2, a potential of the node N10 becomes almost equal to the power supply VCC. So, a positive high voltage is produced at the charge outflowing node N15 connected to the positive output terminal VPP, boosted by the pumping units cascaded.

Contrarily when the control signal of HIGH level is supplied to the switch control terminal SW while the pumping clocks CLK1 and CLK2 active, a negative high voltage is produced at the negative output terminal VBB connected to the node N10 by charge suction of the pumping units, the charge outflowing node N15 thereof grounded through the second switch transistor 2 turned to ON.

Therefore, by controlling the first and the second switch transistors 1 and 2 by the control signal, both positive and negative high voltages can be obtained with only one circuit, enabling chip size reduction by economizing chip space needed for voltage booster circuits.

Figure 3:
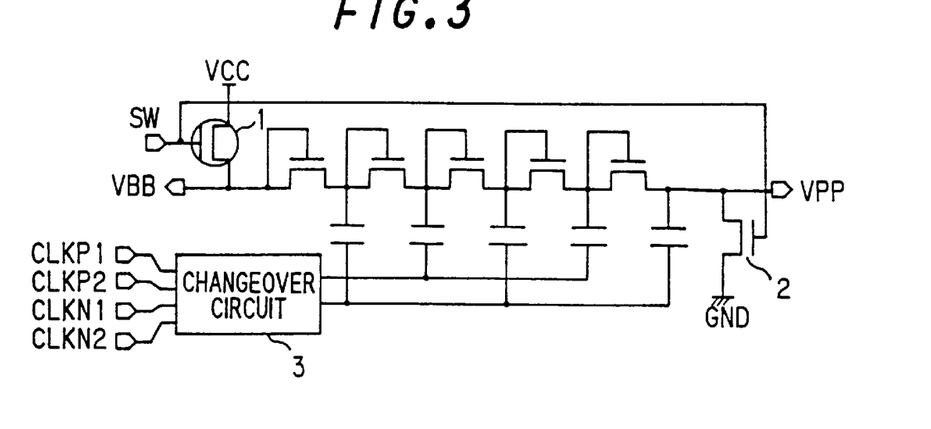
FIG. 3 illustrates a configuration of another embodiment of the invention.

FIG. 3 is a block diagram illustrating a second embodiment of the invention, wherein comprised a changeover circuit 3 in addition to the circuit configuration of FIG. 1 for changing the complementary pumping clock signals to be supplied to the capacitors of the pumping units.

In many cases, in a semiconductor memory device such as an EEPROM and a flash memory, the absolute value of the required negative high voltage doesn't agree with that of the required positive high voltage.

As beforehand described, node potential is boosted or lowered by a pumping unit for peak to peak value of the pumping clock signals deducted of the threshold voltage Vt of the MOS transistor diode-connected. Therefore, absolute values of the positive high voltage and the negative high voltage are to be equal in the voltage booster circuit of FIG. 1, which is inconvenient when different absolute values are desired for the positive and the negative high voltages.

Figure 4:
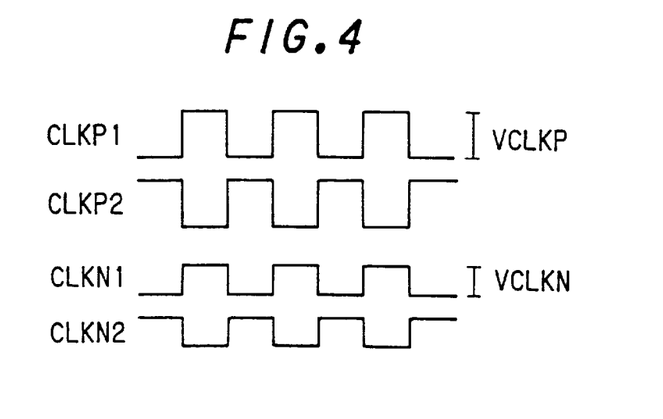
FIG. 4 is a waveform diagram illustrating an example of complementary clock signals supplied to the embodiment of FIG. 3.

For the purpose, there is provided the changeover circuit 3 wherein supplied two pairs of complementary pumping clocks CLKP1, CLKP2 and CLKN1, CLKN2 each pair having different amplitude. When generating the positive high voltage, the changeover circuit 3 selects and supplies the complementary pumping clocks CLKP1 and CLKP2 having appropriate amplitude VCLKP such as illustrated in FIG. 4, for example, while selecting the complementary pumping clocks CLKN1 and CLKN2 having another amplitude VCLKN when generating the negative high voltage.

Therefore, the positive and the negative high voltage with desired absolute values can be obtained by one voltage booster circuit in the embodiment.

Figure 5:
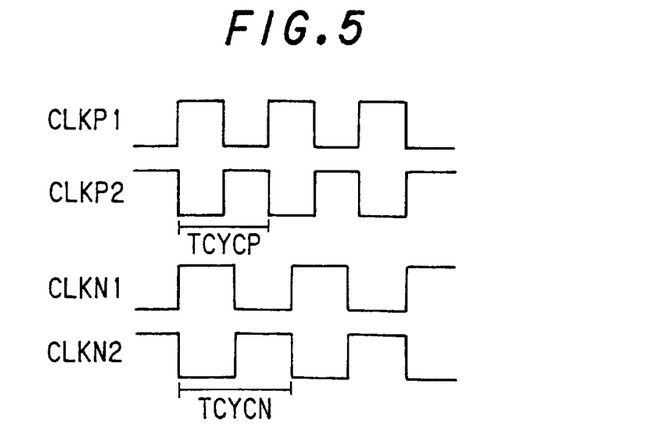
FIG. 5 is a waveform diagram illustrating another example of complementary clock signals supplied to the embodiment of FIG. 3.

FIG. 5 is a waveform diagram illustrating another example of the two pairs of complementary pumping clocks CLKP1, CLKP2 and CLKN1, CLKN2.

As previously described, output potential of the voltage booster circuit of FIG. 1, for example, also depends on clock frequency of the pumping clocks. So, the complementary pumping clocks CLKP1 and CLKP2 may be clock signals having the same amplitude and a different cycle, TCYCP as illustrated in FIG. 5, for example, prepared according to desired value of the positive high voltage to be output, compared to the complementary pumping clocks CLKN1 and CLKN2 having another cycle TCYCN prepared according to desired value of the negative high voltage to be output, in the embodiment of FIG. 3.

In the conventional voltage booster circuits of FIG. 9 and FIG. 10 which are driven by two phase complementary pumping clocks CLK1 and CLK2, potential of each node is boosted or lowered by one pumping unit for peak to peak value of the pumping clock signals, but deducted by the threshold voltage Vt of the MOS transistor diode-connected, as above described. Further, as it is, in voltage booster circuits having many pumping units, boosting efficiency per one pumping unit becomes low, since the threshold voltage Vt of a MOS transistor diode-connected becomes the larger when the potential difference between a gate and substrate becomes the larger because of the substrate effect.

Figure 12:
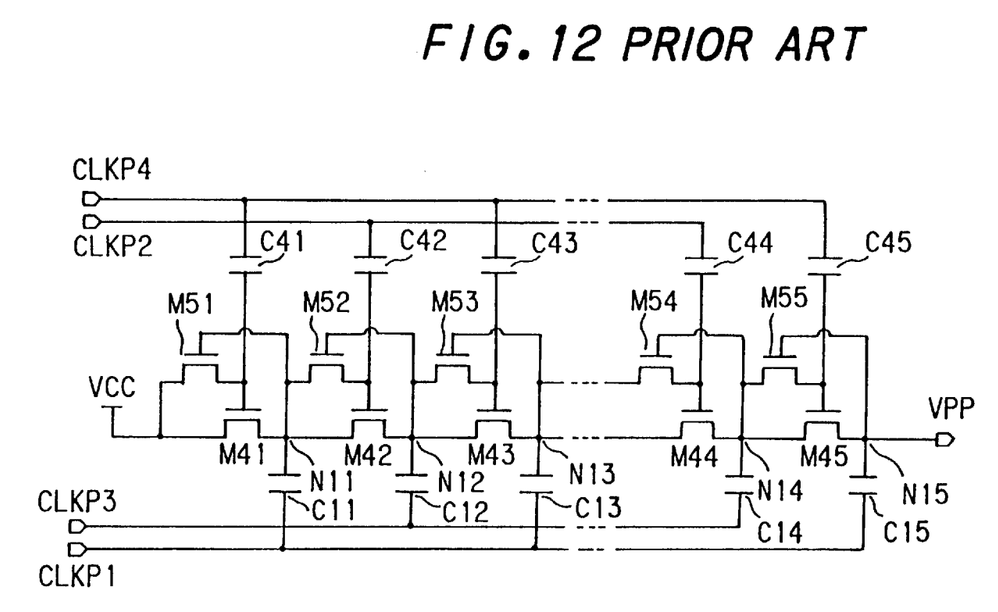
FIG. 12 is a circuit diagram illustrating a four-phase clock positive voltage booster circuit of a prior art.
Figure 13:
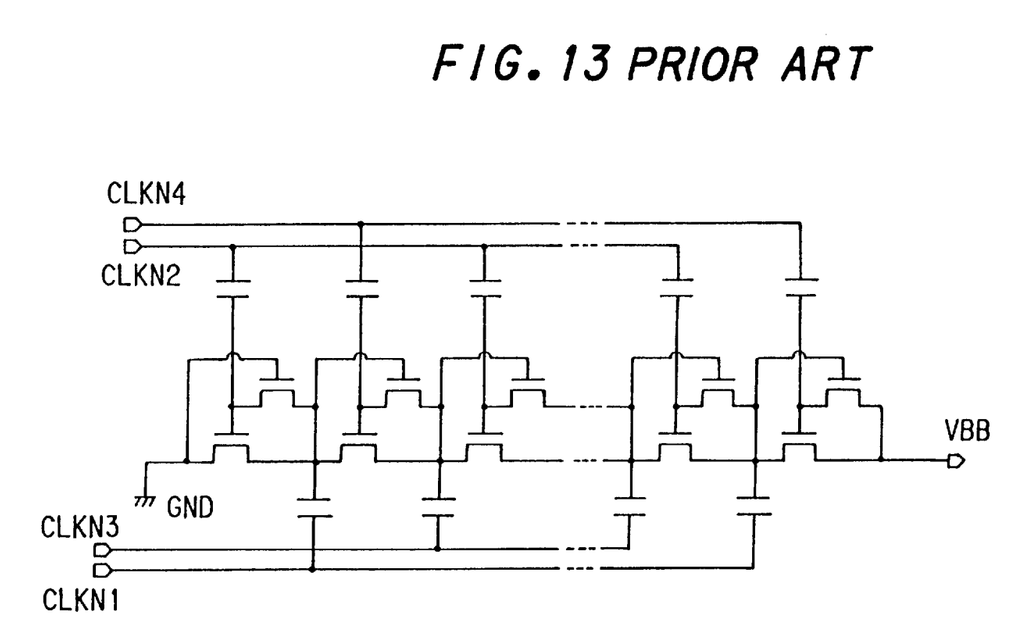
FIG. 13 is a circuit diagram illustrating another four-phase clock negative voltage booster circuit of a prior art.

For improving the boosting efficiency, a four-phase clock voltage booster circuit having a circuit configuration of FIG.

12 or FIG. 13 has been used, wherein, in the positive four-phase clock voltage booster circuit of FIG. 12, node of each pumping unit is supplied from its preceding node through a MOS transistor, M42 for example, instead of the MOS transistor M12 diode-connected.

Figure 7:
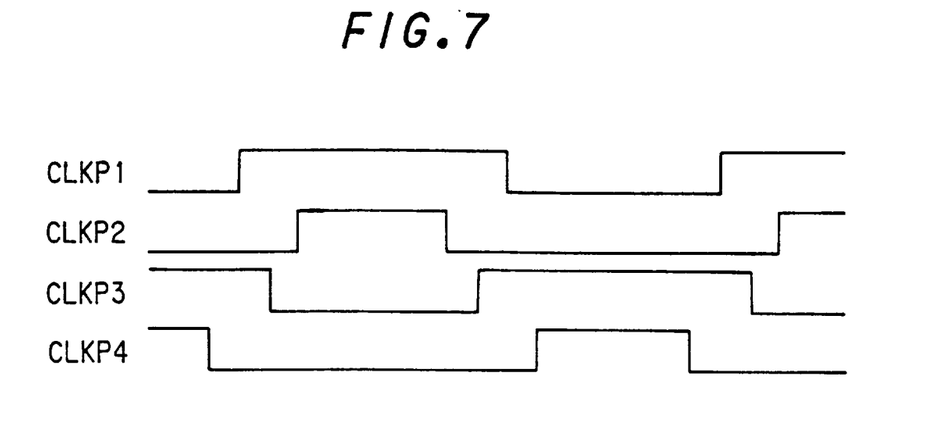
FIG. 7 is a waveform diagram illustrating an example of clock signals to be supplied to a four-phase clock voltage booster circuit.

Referring to a waveform chart of FIG. 7, in the example of FIG. 13, gate of the MOS transistor M42 is controlled by potential of its preceding node N11 through another MOS transistor M52 when the node N11 is pushed up by a pumping clock CLKP1, and then, further, the gate potential is bootstrapped by another clock CLKP2 having pulse width narrower than the pumping clock CLKP1 through a capacitor C42 and the MOS transistor M52.

Thus, potential deduction by the threshold voltage Vt of MOS transistors being eliminated in the conventional positive four-phase clock voltage booster circuit of FIG. 12, a higher boosting efficiency can be obtained than in the circuit of FIG. 9 driven by two phase complementary clocks CLK1 and CLK2.

Figure 8:
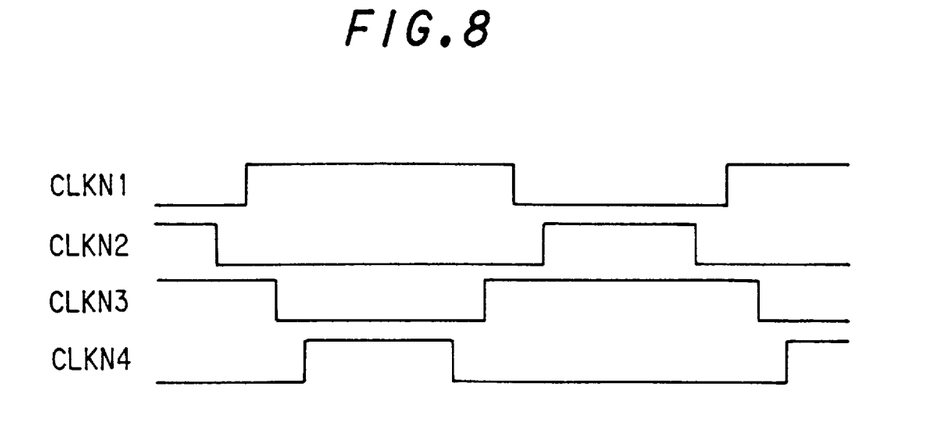
FIG. 8 is a waveform diagram illustrating an example of clock signals to be supplied to another four-phase clock voltage booster circuit.

Similarly, a negative high voltage is obtained with high boosting efficiency from the negative four-phase clock voltage booster circuit of FIG. 13 by supplying two pairs of clocks CLKN1 to CLKN4 as illustrated in FIG. 8 and duplicated description is omitted.

The present invention can be also applied for the four-phase clock voltage booster circuits such as above described referring to FIGS. 12 and 13.

Figure 6:
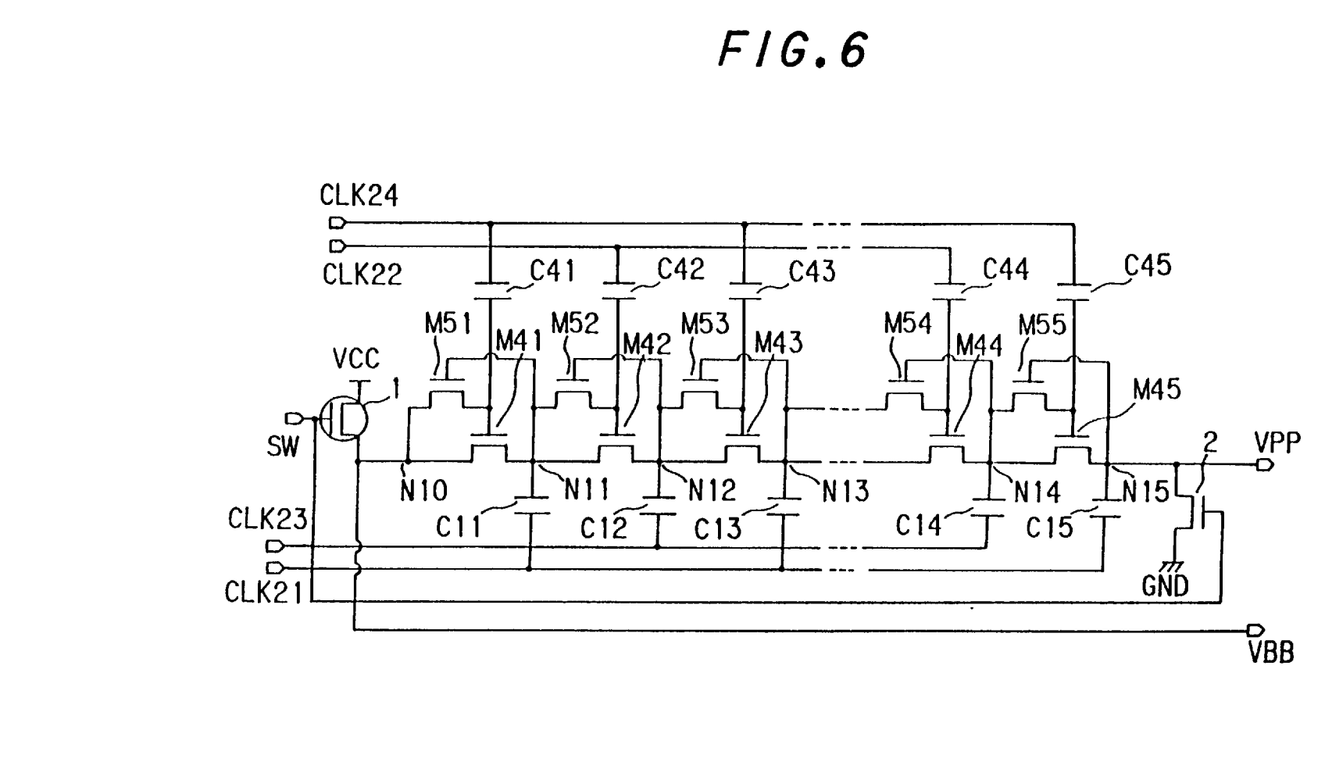
FIG. 6 is a circuit diagram illustrating still another embodiment of the invention.

FIG. 6 is a circuit diagram illustrating a still another embodiment of the invention, wherein provided, further to the conventional positive four-phase clock voltage booster circuits of FIG. 12, a negative output terminal VBB connected to a node N10 for generating a lowest potential in the circuit, a first switch 1 through which the positive power supply VCC is supplied to the node N10, and a second switch 2 through which the positive output terminal VPP is grounded.

In the same way with the first embodiment of FIG. 1, a positive high voltage and a negative high voltage can be generated with only one circuit by controlling the first and the second switch 1 and 2, with high boosting efficiency without voltage deduction because of the threshold voltages, in the embodiment.

Heretofore, some embodiments of the invention applied for two-phase clock and four-phase clock voltage booster circuits are described. However it can be understand that application of the invention is not limited in the embodiments and other various applications can be devised in the scope of the invention concerning charge transfer type voltage booster circuits having charge transfer circuits.

What is claimed is:

1. A voltage booster circuit having a charge transfer circuit wherein charges are transferred from a lowest node to a highest node, comprising:

switching means for selecting one of a positive high voltage output mode and a negative high voltage output mode, a positive high voltage being output from said highest node by supplying a first power supply voltage to said lowest node in said positive high voltage output mode, and a negative high voltage being output from said lowest node by supplying a second power supply voltage to said highest node in said negative high voltage output mode.

2. A voltage booster circuit recited in claim 1, wherein:

said lowest node is connected to said first power supply voltage through a first switch;

said highest node is connected to said second power supply voltage through a second switch;

said first switch is turned to ON and said second switch is turned to OFF in said positive high voltage output mode; and said first switch is turned to OFF and said second switch is turned to ON in said negative high voltage output mode.

3. A voltage booster circuit recited in claim 2, wherein:

potential of said first power supply voltage is equal to potential of a power supply terminal of an IC chip where the voltage booster circuit is provided; and potential of said second power supply voltage is equal to potential of a ground terminal of said IC chip.

4. A voltage booster circuit recited in claim 1, wherein:

amplitude of complementary clock signals supplied to said charge transfer circuit in said positive high voltage output mode is controlled to be different to amplitude of said complementary signals in said negative high voltage output mode.

5. A voltage booster circuit recited in claim 1, wherein:

frequency of complementary clock signals supplied to said charge transfer circuit in said positive high voltage output mode is controlled to be different to frequency of said complementary clock signals in said negative high voltage output mode.

6. A voltage booster circuit recited in claim 4, comprising a changeover circuit for selecting said complementary clock signals to be supplied to said charge transfer circuit from more than one pair of complementary clock signals having different amplitude.

7. A voltage booster circuit recited in claim 5, comprising a changeover circuit for selecting said complementary clock signals to be supplied to said charge transfer circuit from more than one pair of complementary clock signals having different frequency.

8. A voltage booster circuit recited in claim 1, wherein said charge transfer circuit supplied with a pair of complementary clock signals comprises a cascade connection of a plurality of pumping units:

a first of said plurality of pumping units having a node supplied from said lowest node through a diode connection of a MOS transistor and coupled to one of said pair of complementary clock signals through a capacitor; and other each of said plurality of pumping units having a node coupled through a capacitor to one of said pair of complementary clock signals and supplied from a node of a preceding pumping unit of said other each of said plurality pumping units through a diode connection of MOS transistor, said node of said preceding pumping unit coupled to the other of said pair of complementary clock signals through another capacitor.

9. A voltage booster circuit recited in claim 1, wherein said charge transfer circuit comprises a cascade connection of a plurality of pumping units supplied with two pairs of complementary clock signals of the same frequency:

each of said two pairs of clock signals being a pair of a narrow pulse signal and a wide pulse signal having the same phase, π different with each other pair;

a first of said plurality of pumping units having a node supplied from said lowest node through a MOS transistor with its gate bootstrapped coupled through a capacitor to said narrow pulse signal of one of said two pairs of clock signals and diode-connected through another MOS transistor gated by potential of said node coupled through another capacitor to said wide pulse signal of said one of said two pairs of clock signals; and other each of said plurality of pumping units having a node supplied from a node of a preceding pumping unit of said other each of said plurality pumping units through a MOS transistor with its gate bootstrapped coupled through a capacitor to said narrow pulse signal of one of said two pairs of clock signals and diode-connected through another MOS transistor gated by potential of said node coupled through another capacitor to said wide pulse signal of said one of said two pairs of clock signals, said node of said preceding pumping unit coupled through a capacitor to said wide pulse signal of the other of said two pairs of clock signals.

* * * * *